US009280357B2

(12) United States Patent
Shaver et al.

(10) Patent No.: US 9,280,357 B2
(45) Date of Patent: Mar. 8, 2016

(54) CONFIGURATION BASED ON CHASSIS IDENTIFICATIONS

(75) Inventors: Charles N Shaver, Cypress, TX (US); Robert C Brooks, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/126,844

(22) PCT Filed: Jul. 12, 2011

(86) PCT No.: PCT/US2011/043737
§ 371 (c)(1),
(2), (4) Date: Dec. 16, 2013

(87) PCT Pub. No.: WO2013/009304
PCT Pub. Date: Jan. 17, 2013

(65) Prior Publication Data
US 2014/0122746 A1    May 1, 2014

(51) Int. Cl.
G06F 3/00      (2006.01)
H04B 7/185   (2006.01)
G06F 9/44     (2006.01)
G06F 1/18     (2006.01)
G06F 13/10   (2006.01)

(52) U.S. Cl.
CPC .............. *G06F 9/4411* (2013.01); *G06F 1/182* (2013.01); *G06F 13/102* (2013.01)

(58) Field of Classification Search
CPC ......... G11C 29/808; G06F 1/181; H05K 1/14
See application file for complete search history.

(56) References Cited

U.S. PATENT DOCUMENTS

| | | | |
|---|---|---|---|
| 6,301,124 B1 | 10/2001 | Nikazm et al. | |
| 6,970,948 B2 | 11/2005 | Brown et al. | |
| 7,062,545 B1 | 6/2006 | Donkin et al. | |
| 7,768,797 B1 * | 8/2010 | Hockin | 361/807 |
| 7,870,312 B2 | 1/2011 | Thomas | |
| 7,873,846 B2 | 1/2011 | Sakthikumar et al. | |
| 2001/0014008 A1 | 8/2001 | Allirot | |
| 2002/0167896 A1 * | 11/2002 | Puntambekar | 370/216 |
| 2007/0145828 A1 * | 6/2007 | Taylor et al. | 307/64 |
| 2009/0147459 A1 | 6/2009 | Nguyen et al. | |
| 2009/0234995 A1 * | 9/2009 | Langgood et al. | 710/104 |
| 2012/0033541 A1 * | 2/2012 | Jacob Da Silva et al. | 370/217 |

* cited by examiner

*Primary Examiner* — Hyun Nam
(74) *Attorney, Agent, or Firm* — Hewlett-Packard Patent Department

(57)    ABSTRACT

Techniques for configuration are provided. A chassis ID identifies a chassis type. A device, such as a circuit board, may receive the chassis ID from the chassis. The device may be configured based on the chassis type.

10 Claims, 5 Drawing Sheets

CONFIGURATION BASED ON CHASSIS IDENTIFICATIONS

BACKGROUND

Computing devices are available in a wide variety of form factors. One of the more traditional form factors is a desktop configuration which may include a chassis, such as a desktop or tower case, which houses the motherboard on which the central processing unit (CPU) and other components, such as memory, are installed. Attached to the motherboard, through the chassis, may be external devices, such as a monitor, keyboard, and pointing device (e.g. mouse). Another traditional form factor may be a laptop form factor, in which the motherboard, monitor, keyboard, and pointing device, are integrated into a single chassis. A newer form factor may include an all-in-one form factor, in which the monitor and motherboard are integrated into a single chassis, while the keyboard and pointing device remain external to the chassis.

In addition to the wide variety of form factors, computing devices may also receive power from several different sources. For example, a traditional desktop computer may receive alternating current (AC) power from a standard wall outlet. A laptop may operate from a standard wall outlet or may receive power from a charged battery. Another source of power may be a circuit that may also be used for other functions. For example, in Power over Ethernet (PoE), the computing device may receive power over a cable that connects the computing device to a network. Thus, the network cable may be used for both power and network connectivity purposes.

DETAILED DESCRIPTION

Figure 1:
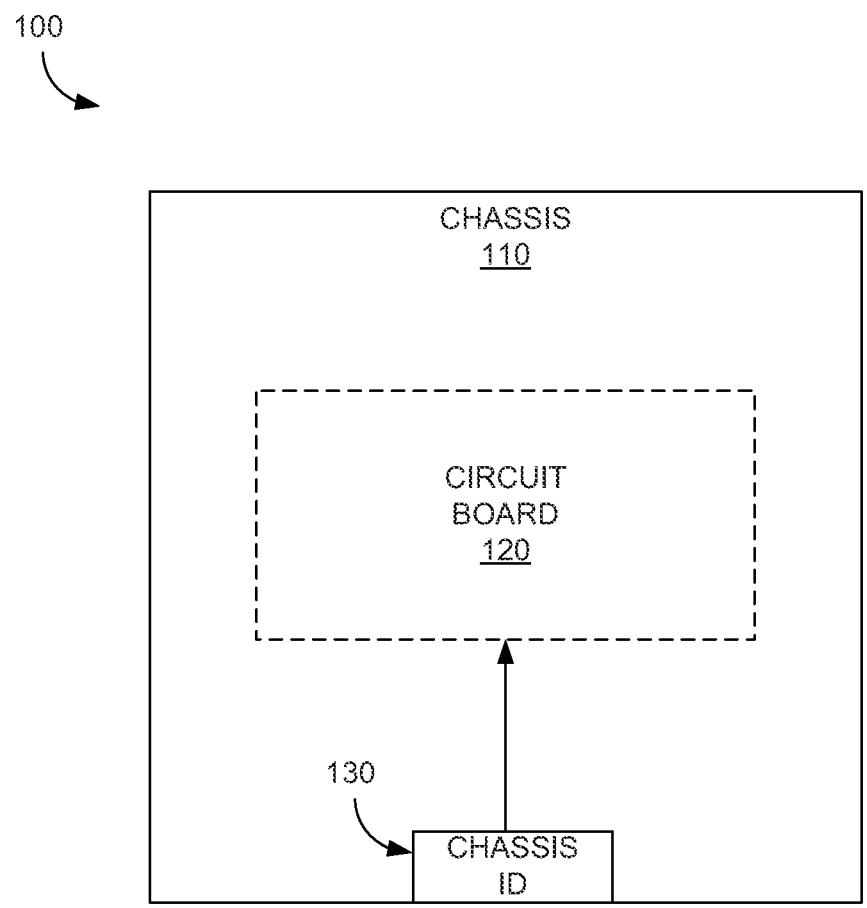
FIG. 1 depicts a high level diagram of an example of a circuit board in a chassis.

The increasing variety of form factors and power sources for computing devices has provided many benefits for users, as the user may choose the form factor and/or power source that is most suitable for the user's application. For example, a desktop configuration may be suitable for a user in a traditional fixed office environment, while a laptop may be more suitable for a mobile user. All-in-one configurations may provide benefits, such as a reduced desktop footprint, for users that have space constraints. Similarly, the variety of power sources may also be beneficial to a user. For example, in computing kiosk or electronic sign applications, it may not be possible to provide power from a traditional source, such as a wall outlet, as no outlet may exist at the desired location. Installing a wall outlet in such situations may be expensive and/or impossible, due to the need to comply with building codes and the proximity of a suitable power source. By utilizing PoE, power may be supplied to the computing device over a network cable, whose installation is generally easier and/or less expensive than providing standard wall outlet power, due to less stringent regulations imposed on networking cables.

Although the increase in variety of form factors and power sources, the combination of which can be referred to as a chassis, has provided benefits to users, it has also created inefficiencies for computing device manufacturers. In many cases the components which provide the base functionality of a computing device remain the same regardless of the form factor or power source, and it would be desirable to reuse the same components to provide that functionality. For example, a computing device, regardless of chassis, may have a motherboard that contains memory and a CPU to execute instructions that may be stored in that memory. It would be more efficient to design a single motherboard that would work in more than one chassis.

However, in addition to these common components on the motherboard, there may also be included components that are specific to an individual form factor. For example, a motherboard that is designed to be powered from a wall outlet may include components requiring higher levels of power than that which is available from PoE. A manufacturer may need to design and build one version of the motherboard for use with PoE and a different version if the power source is a wall outlet, despite the fact that many, if not most, of the other components on the motherboard are common regardless of the power source. The duplication may cause numerous problems, one of which is that two different designs, each of which require separate validation, are needed. In addition, as the motherboards would be different, the manufacturer would need to keep separate inventory of each motherboard, as they would not be interchangeable.

A non-optimal solution to this problem may be to design a motherboard that uses components operable with the least demanding chassis. For example, in the case of PoE, all components may be selected such that sufficient power is available from PoE. However, this solution may not be optimal because it comes at the expense of the more capable form factors. Forcing a design to conform to the restrictions imposed by less capable chassis results in handicapping more capable chassis.

Another non-optimal solution is to design a motherboard that is manually configurable to support different chassis. One example of this is to provide jumpers on the motherboard that allow the motherboard to be configured for the particular chassis in which it is installed. Although this solution may overcome the need to have separate motherboard designs, it introduces the problem that a user may incorrectly configure the motherboard, which may result in damage to the motherboard.

Techniques disclosed herein provide for the ability to create a single design for a circuit board, such as a computer motherboard, that may be usable in more than one type of chassis. Components on the motherboard may be enabled/disabled based on the chassis in which the motherboard is installed. The operation of the components on the motherboard may be configured to behave differently based on the chassis in which the motherboard is installed. The techniques disclosed herein occur automatically, without requiring user action, thus beneficially eliminating the possibility of user configuration error. Because the same motherboard is usable in different chassis, the manufacturer is beneficially able to maintain a single inventory of motherboards.

FIG. 1 depicts a high level diagram of an example of a circuit board in a chassis. The system 100 may include a chassis 110, a circuit board 120, and a chassis identifier (ID) 130. The chassis may be any type of housing that may contain the circuit board. For example, in the case of a computing device, the chassis may be a desktop or tower type case. In other implementations the chassis may be a laptop configuration. In yet another example, the chassis may be an all-in-one type of chassis. Although several examples of chassis types are described, it should be understood that a chassis may exist in any form factor.

The chassis 110 may house a circuit board 120. In one example implementation, the circuit board may be a motherboard that contains components that together form a computer. For example, the motherboard may contain a CPU, memory coupled to the CPU, components to provide video output, components to interface with external devices, or any other components necessary to allow the circuit board to provide the desired functionality. The circuit board, which may also be referred to as the motherboard, main board, or system board, may contain the components that are used to provide the desired functionality of the system 100.

Included in the chassis 110 may be a chassis ID 130. The chassis ID may identify the type of chassis. For example, the chassis ID may specify if the chassis is a desktop or an all-in-one form factor. For purposes of this description, the chassis ID will specify if a chassis is a desktop form factor or an all-in-one form factor, and may thus be represented by one signal. For example, a chassis ID may be a signal line that is connected to the circuit board 120, and the signal line takes on a high voltage (e.g. logic level one) for a desktop form factor and a low voltage (e.g. logic level zero) for an all-in-one chassis. However, this simplification is for purposes of ease of explanation. In some implementations, the chassis ID may identify any number of different types of chassis. For example, the use of two signal lines to identify a chassis may allow up to four chassis types, as there are four possible combinations of binary signals that may be present on the two signal lines.

When a circuit board 120 is coupled to a chassis 110, the chassis ID 130 may be provided to the circuit board. The circuit board may then be automatically configured based on the chassis ID. For example, the circuit board may be configured to operate based on the capabilities of the chassis in which it is installed. Because the circuit board may be automatically configured to operate with a given chassis after being coupled to the chassis, there is no need to have different circuit boards for each type of chassis. In addition, because the configuration is automatic, there is no need for manual configuration of the circuit board based on the chassis in which it is installed.

Figure 2:
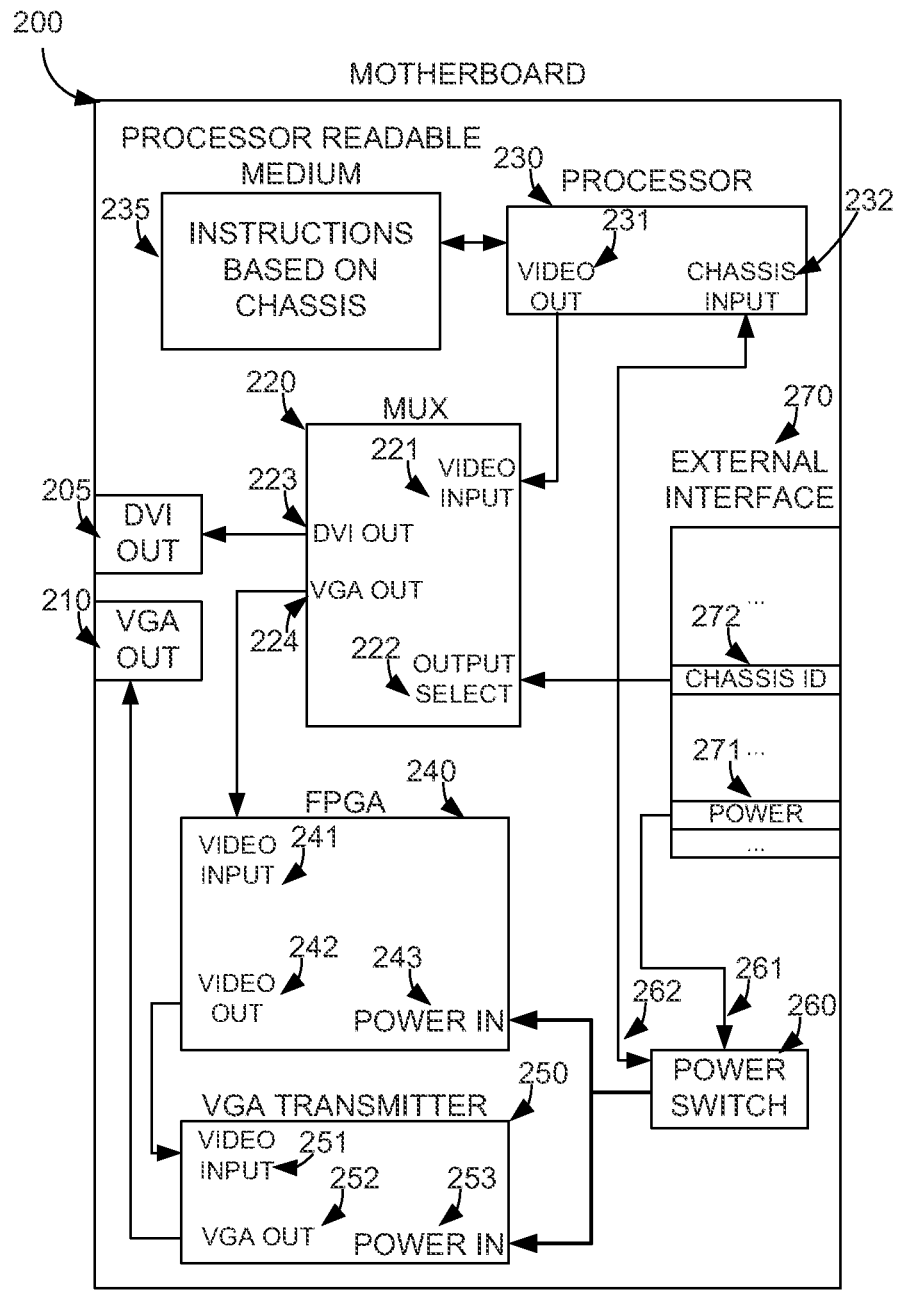
FIG. 2 depicts a high level diagram of an example of a circuit board that may be automatically configured.

FIG. 2 depicts a high level diagram of an example of a circuit board that may be automatically configured. For example, the circuit board may be a motherboard 200 that could be included in a computer. For purposes of this description an example implementation is described. In this example implementation, there may be two possible types of chassis, which will be referred to as a desktop chassis and an all-in-one chassis. The two types of chassis may have separate capabilities. For example, the desktop chassis may be powered by standard AC power, while the all-in-one chassis receives power through a PoE connection.

In one example implementation, there may be two types of video output. The first may be a Digital Video Interface (DVI) 205 output and the second may be a Video Graphics Array (VGA) 210 output. A multiplexor (MUX) 220 may be used to select which type of video output is enabled. For example, the MUX may receive a video input 221 from a video output 231 of a CPU 230. An output select 222 signal may be used by the MUX to determine if the video input from the CPU is sent to the DVI output 223 or if there will be additional processing to enable VGA output. The additional processing may be performed by Field Programmable Gate Array 240 in conjunction with VGA transmitter 250. Operation of the output select signal will be described in further detail below.

In one example implementation, the VGA output 224 from the MUX 220 may be sent to the video input 241 of the FPGA 240 for additional processing, such as doubling of the frame rate, or any other desired processing. The video output 242 of the FPGA may then be sent to a video input 251 of a VGA transmitter 250. The VGA transmitter may process the video signal to conform the signal as needed to comply with the VGA output standard. The video signal may then be sent from the VGA output 252 of the VGA transmitter to the VGA output 210 of the motherboard 200.

In the example implementation that is being described, the FPGA 240 and VGA transmitter 250 may require more power to operate than that which is available via PoE. Thus, if the chassis is an all-in-one type chassis, VGA output may not be available because sufficient power is not available from PoE. In some implementations, simply powering up the FPGA and VGA transmitter, even if they are not used, may require more power than is available. The FPGA and VGA transmitter may receive power through power in inputs 243, 253 respectively. In turn, the power provided to those inputs may be provided by a power switch 260.

The power switch 260 may determine if power is provided to the FPGA 240 and VGA transmitter 250. In other words, in some implementations, the power switch is an on/off switch which cuts off the flow of power when the switch is off. In operation, the power switch receives power 261 and an input signal 262 that determines if the switch is on or off. Operation of the power switch is described in further detail below. An example implementation of a power switch is described with respect to FIG. 4.

The motherboard 200 may also include an external interface 270. The motherboard may receive external inputs, such as power 271 through the external interface. For example, in the case of PoE, the external interface may include an Ethernet port which will connect to an Ethernet network cable, which in turn provides power. In a different implementation, power may be received from the chassis, such as from a power supply contained within the chassis. The external interface may also include a chassis ID 272. The chassis ID may be used to identify the chassis in which the motherboard is installed. For example, for the example implementation that is being described, the chassis ID may be a signal in the form of a voltage that is provided by the chassis. In the present example, a voltage that indicates a logic level one may indicate one type of chassis, while a logic level zero may indicate a different type of chassis. Regardless of how implemented, the chassis ID may be used by the motherboard to identify the type of chassis in which the motherboard is installed.

As mentioned above, the motherboard 200 may also include a CPU 230, which may also be referred to as a processor. In addition to providing video output 231, the CPU may also be coupled to a non-transitory processor readable medium 235. The processor readable medium may store a set of instructions that are executed by the processor. The processor may also have a chassis input 232. The chassis input may receive an input signal that allows the processor to determine in which type of chassis the motherboard is installed. The processor may execute some instructions stored in the processor readable medium based on the type of chassis in which the motherboard is installed. For example, if the motherboard is installed in a desktop chassis, the processor may execute a first set of instructions, while if the motherboard is installed in an all-in-one chassis, a second of set of instructions may be executed.

In operation, the motherboard 200 may be installed in a chassis. The chassis ID 272 may indicate to the motherboard the type of chassis in which the motherboard is installed. The power switch 260 may receive the chassis ID signal and provide power 261 to the FPGA 240 and VGA transmitter 250 based on the type of chassis. For example, if the chassis ID indicates an all-in-one chassis, the power switch would remain in the off, as PoE cannot supply sufficient power to the FPGA or VGA transmitter. In other words, the power switch selectively provides power to a component based on the chassis ID. Beneficially, this configuration occurs automatically. The configuration is immune to any user configuration errors, as the motherboard may configure itself automatically based on the chassis ID. Furthermore, the configuration may occur as soon as the motherboard and chassis are turned on. Thus, there is no need to wait for the motherboard to initialize and determine the chassis type prior to setting the on/off status of the power switch. The power switch may be turned on or off as soon as the motherboard is connected to power and the chassis.

There may also be a circuit between the chassis ID 272 and the output select 222 of the MUX 220. The circuit may contain additional components (not shown) in order to condition the chassis ID signal for use by the MUX. Such a conditioning circuit is described with respect to FIG. 3. The MUX is an example of a component whose operation is determined by an external input (e.g. the output select). The circuit between the chassis ID and the output select is an example of a selection circuit that drives the external input based on the chassis ID. The chassis ID may be beneficially used to configure the output of the MUX based on the type of chassis in which the motherboard 200 is installed. For example, in some implementations, if the chassis is an all-in-one type chassis, VGA output should not be enabled due to the limitations of PoE. The chassis ID may be used by the MUX to select the DVI output 223 as opposed to the VGA output 224. Just as above, with respect to the power switch, such configuration occurs automatically and prior to the motherboard being initialized. As soon as power is supplied to the motherboard and the motherboard is coupled to a chassis, the MUX may be configured.

There may also be a circuit between the chassis ID 272 and the chassis input 232 on the CPU 230. The circuit may contain additional components (not shown) in order to condition the chassis ID signal for use by the CPU. Such a conditioning circuit is described with respect to FIG. 3. The chassis input may receive the chassis ID signal and the processor may execute instructions from the processor readable medium 235 based on the type of chassis in which the motherboard is installed. For example, if the motherboard is installed in an all-in-one chassis, the CPU may automatically configure the video out 231 for use with the DVI out 205. Just as described above, the chassis ID is available to the CPU as soon as the motherboard receives power and is installed in a chassis. As such, the CPU is able to configure itself for operation prior to being fully initialized, as the chassis ID is available before the CPU or the motherboard is fully initialized.

Although FIG. 2 has been described in terms of two types of chassis, it should be understood that the techniques disclosed herein are not limited to two types. The chassis ID signal may indicate any number of different types of chassis. The chassis ID signal may be multiple signal lines, the combination of which may determine the type of chassis. Thus, with a single signal line, two chassis types may be identified. With two signal lines, four chassis types may be identified. In general, the number of signal lines raised to the power of two may determine the number of different chassis that may be identified.

Furthermore, the description of FIG. 2 has been presented in terms of configuring video output, but the techniques disclosed herein may be used for any other configuration purposes. For example, the power switch may be used to determine if power is supplied to any type of component, not just FPGA or VGA transmitter components. What should be understood is that the chassis ID may be used to provide or deny power to any type of component, based on the chassis ID. Likewise, in the present example, the chassis ID is used to select the output of a MUX. However, the techniques disclosed herein are applicable to other types of configuration. For example, the chassis ID may be used on an enable input of a component. What should be understood is that the chassis ID may be used to configure any type of component that is configurable based on an input signal.

Figure 3:
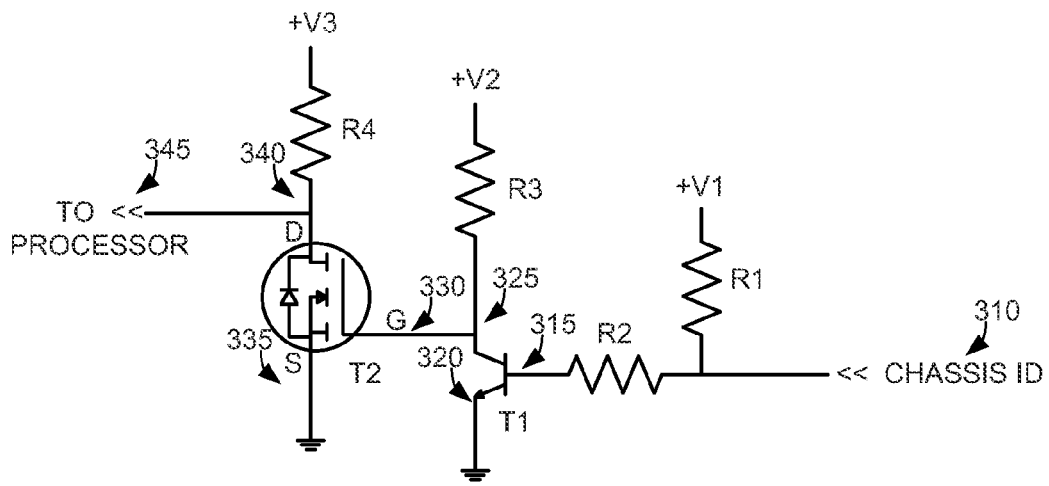
FIG. 3 depicts an example of a circuit for signal isolation and conditioning.

FIG. 3 depicts an example of a circuit for signal isolation and conditioning. The circuit depicted in FIG. 3 may be used to isolate an input signal, such as a chassis ID, from the component that is receiving the signal in order to protect the component from out of range voltage. The circuit may also be used to alter the level of the signal. For example, the chassis ID may be a signal that uses positive five volts to indicate a logic level one and zero volts to indicate a logic level zero. The component that is receiving the signal may use different values, such as a positive three point three volts for a logic level one. The circuit in FIG. 3 may be used to modify the signal to the correct voltage range.

The circuit 300 may include the chassis ID signal 310. A high voltage, such as positive five volts may indicate a logic level one, while zero volts indicates logic level zero. Resistor may connect a positive voltage source V1 to the chassis ID signal. R1 may be used as a pull up resistor to ensure that the chassis ID signal does not float. The signal may then pass through resistor R2. Resistor R2 may be used to limit the current that flows through the base 315 of transistor T1. Transistor T1 may be an NPN binary junction transistor (BJT). If current flows between the base and the emitter 320 of BJT transistor T1, the transistor will be in an on state. If transistor T1 is in an on state, current is able to flow between the collector 325 and the emitter 320. As such, if the chassis ID is a high voltage, indicating logic level one, current will flow through resistor R2 from the base of the BJT transistor to the emitter 320 which is tied to ground. The flowing current will cause the BJT transistor to allow current to flow from the collector 325 to the emitter 320. Likewise, if the chassis ID signifies a low voltage, indicating logic level zero, no current will flow from the base to the emitter, and as such, no current will flow from the collector to the emitter of T1.

Resistor R3 is connected to a positive voltage V2 and is also connected to the collector 325 of transistor T1. If the transistor T1 is on, and operating in the saturation mode, such that current flows between the collector 325 and the emitter 320, there will be a voltage drop approximately equal to V2 across R3, thus making the voltage at the collector of T1 approximately equal to zero. Thus, the signal level at the collector of T1 will indicate a logic level of zero. Likewise, if the transistor T1 is not on, there will be no current flowing between the collector and the emitter, and there will be no voltage drop across resistor R3. Thus, the voltage at the collector of T1 will be approximately equal to V2. What should be understood is that the logic level at the collector of transistor T1 may be the opposite of the logic level of the chassis ID 310.

The collector 325 of transistor T1 may be connected to the gate 330 of transistor T2. Transistor T2 may be an N type Metal Oxide Semiconductor Field Effect Transistor (MOSFET). In transistor T2, if the voltage between the gate and the source 335 exceeds a threshold voltage, current may flow between the drain 340 and the source, thus turning the transistor T2 on. Likewise, if the voltage does not exceed the threshold voltage, no current will flow, and the transistor will remain off. Resistor R4 may connect the drain 340 of transistor T2 to a positive voltage V3. If transistor T2 is turned on, current will flow from the drain to the source and there will be a voltage drop approximately equal to V3 across resistor R4, making the voltage at the drain 340 approximately equal to zero. Likewise, if transistor T2 is off, no current will flow between the drain and source, and there will be no voltage drop, thus making the voltage at the drain of transistor T2 equal to approximately V3.

The drain of transistor T2 may then reflect the signal logic level of the chassis ID. A logic level zero on the chassis ID will cause transistor T1 to turn off, which results in transistor T2 turning on. Transistor T2 will then allow current to flow, which will cause the voltage at the drain to be approximately zero volts, reflecting a low logic value. Likewise, if the chassis ID is set to a high logic value, transistor T1 will turn on, which in turn will cause transistor T2 to turn off. Transistor T2 will not allow current to flow, and the resultant voltage at the drain of transistor T2 will be approximately equal to V3. It should be noted that although the logic level of the chassis ID and the drain of transistor T2 may be the same, the absolute voltages may be different. For example, the chassis ID may be zero or positive five volts, while the voltage at the drain may be zero or V3 volts.

Thus, the circuit in FIG. 3 not only isolates the chassis ID input, but also allows for a shift in the voltage level that is interpreted as a logic high value. In other words, a logic high value of the chassis ID is converted to V3 volts, where V3 may be greater than, less than, or the same as the voltage level of the chassis ID. The drain of transistor T2 may then be coupled to a component 345 that utilizes the chassis ID. For example, the drain may be coupled to the CPU or MUX as was described in FIG. 2. The component may then utilize the chassis ID signal, adjusted to the correct voltage range and isolated from the chassis ID signal. It should be understood that the circuit described in FIG. 3 is an example of a circuit that may be used in an implementation of the techniques described herein. Other implementations that provide similar functionality may also be used.

Figure 4:
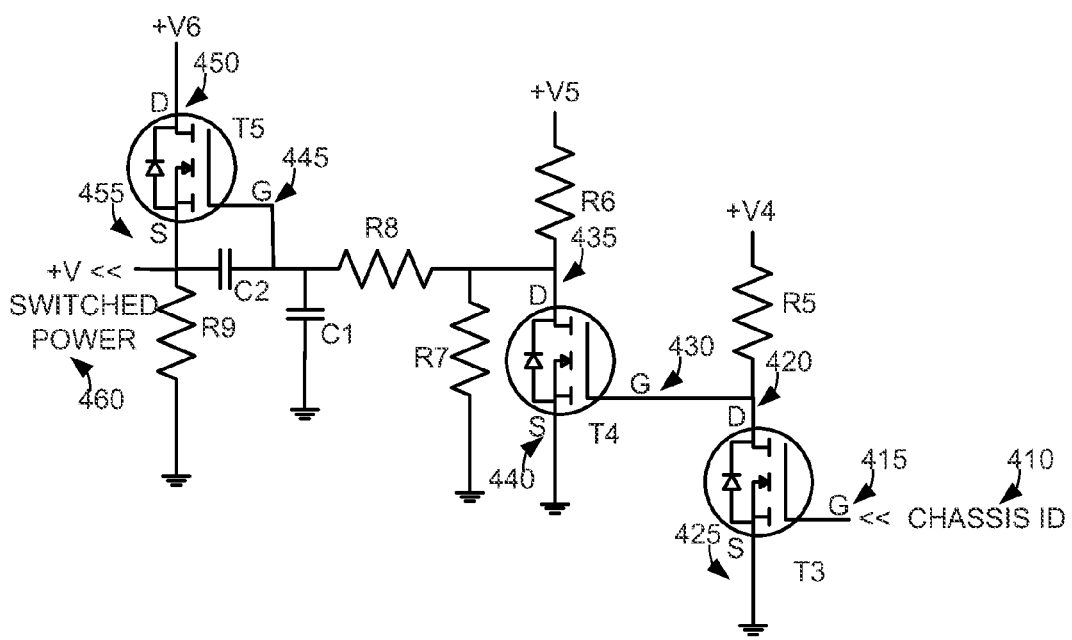
FIG. 4 depicts an example of a circuit for signal isolation and power switching.

FIG. 4 depicts an example of a circuit or signal isolation and power switching. The example circuit shown in FIG. 4 may be an implementation of the power switch 260. The chassis ID signal 410 may be coupled to the gate 415 of transistor T3. For purposes of this description, the transistors described are N-type MOSFETs. If the voltage of the chassis ID signal exceeds a threshold voltage, transistor T3 may turn on, which allows current to flow from the drain 420 to the source 425 of transistor T3. The current may flow from a positive voltage source V4 through resistor R5. If the transistor T3 is on, there may be a voltage drop of approximately V4 volts across resistor R5, which may cause the voltage at the drain of transistor T3 to be approximately zero volts. Likewise, if the transistor is not on, the voltage at the drain of transistor T3 may be approximately V4 volts.

The drain 420 of transistor T3 may be coupled to the gate 430 of transistor T4. If the voltage at the gate of transistor T4 exceeds a threshold voltage, transistor T4 may turn on, thus allowing current to flow from the drain 435 to the source 440 of transistor T4. The current may flow from a positive voltage source V5 across through resistor R6. If the transistor T4 is on and operating in the saturation region, there will be a voltage drop of approximately V5 volts across resistor R6, which may cause the voltage at the drain of transistor T4 to be approximately zero volts. Likewise, if the transistor T4 is off, there will be no current flowing from the drain to the source of transistor T4. Instead, current will flow from the positive voltage source V5 through resistors R6 and R7, and the voltage V5 will be dropped across those resistors. Resistor R6 and R7 in combination form a voltage divider. If transistor T4 is off, the voltage at the drain of transistor T4 will be some fraction of V5, the fraction being determined by the values of R6 and R7.

The drain of transistor T4 may be coupled to the gate 445 of transistor T5 through resistor R8. Resistor R8 may be used to limit the current used to charge capacitors C1 and C2. Capacitor C1 and C2 may be used to provide voltage smoothing to switched power 460, which will be described further below. If the voltage at the gate of transistor T5 exceeds a threshold, the transistor may turn on and allow current to flow from the drain 450 to the source 455 of transistor T5. If the transistor T5 is on, current may flow from positive voltage source V6 through resistor R9. Resistor R9 may be used to limit the amount of current that flows through transistor T5 if there is no load connected to switched power 460. If transistor T5 is on, the voltage at switched power 460 will be approximately equal to voltage V6. If transistor T5 is off, the voltage at switched power 460 will be approximately equal to zero volts, as capacitor C2 will prevent any current from flowing from the gate of T4, and resistor R9 will pull the voltage to ground.

Switched power 460 may be at approximately voltage level V6 when the chassis ID indicates a high logic level and will be at approximately zero volts when the chassis ID indicates a low logic level. Switched power 460 may then be used to provide power to components on the circuit board based on the voltage level of the chassis ID signal. If the chassis ID signal is at a low logic level, transistor T3 will turn off, which in turn will cause transistor T4 to turn on. Transistor T4 turning on will cause transistor T5 to turn off, resulting in a voltage of approximately zero volts at the switched power output 460. Thus components connected to the switched power output 460 will not receive power, based on the voltage level of the chassis ID signal. Likewise, if the chassis ID indicates a high logic level, transistor T3 will turn on, which in turn will cause transistor T4 to turn off. Transistor T4 turning off will result in a voltage level of a fraction of V5 being supplied to the gate of transistor T5. If the voltage level is above a threshold, transistor T5 will turn on, and the voltage at the switched power output 460 will be approximately V6 volts. Components that receive power from switched power output 460 will receive approximately V6 volts when the chassis ID indicates a high logic value.

Thus, the circuit described in FIG. 4 provides several pieces of functionality. Included in this functionality is the ability to switch power on an off based on the chassis ID signal. Furthermore, the circuit described in FIG. 4 allows for the switched power to be in a different voltage range than the chassis ID signal. For example, the chassis ID may have values of zero and five volts, whereas the switched power output may have output values of zero and V6 volts. Thus the chassis ID signal may be used to control voltage that is in a different range than the chassis ID signal. Furthermore, the circuit described in FIG. 4 isolates the components that may be powered by switched power 460 from the chassis ID signal. This isolation may prevent those components from drawing current directly from the chassis ID input signal. It should be understood that the circuit described in FIG. 4 is an example of a circuit that may be used in an implementation of the techniques described herein. Other implementations that provide similar functionality may also be used.

Figure 5:
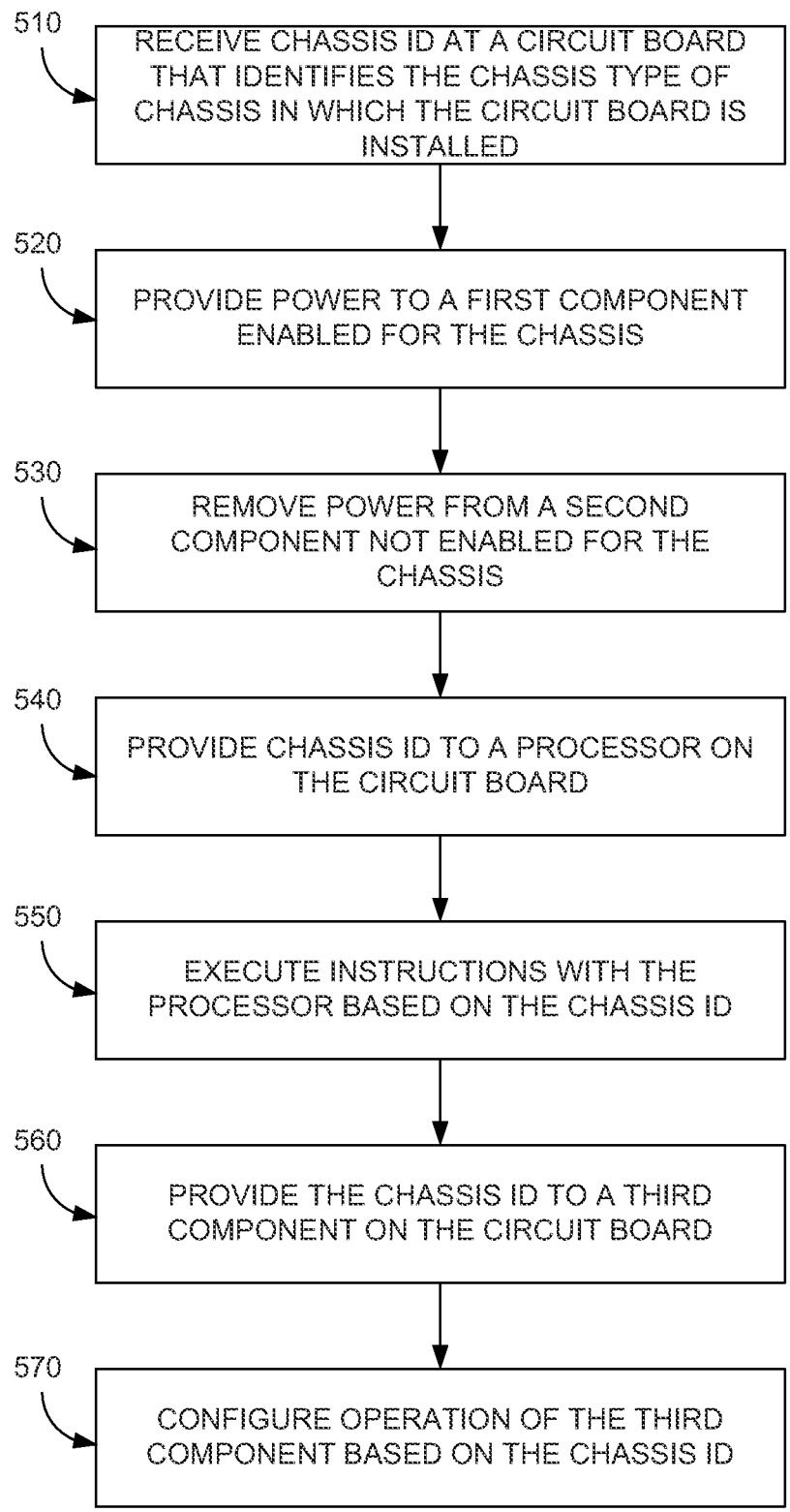
FIG. 5 depicts an example of a high level flow diagram for automatically configuring a circuit board.

FIG. 5 depicts an example of a high level flow diagram for automatically configuring a circuit board. In block 510 the chassis ID may be received by a circuit board. The chassis ID may identify the type of chassis in which the circuit board is currently installed. In block 520, the circuit board may provide power to a first component on the circuit board that is to be enabled for the chassis. In other words, if a component should be enabled for a given chassis type, power may be supplied to that component. In block 530 power may be removed from a second component that is not enabled for the chassis. In other words, if a component should not be enabled for a given chassis type, power may be withheld from that component. The components that will receive or not receive power is based on the chassis in which the circuit board is installed. In some cases, power will be provided to all components based on the chassis type, while in other cases, power is not provided to any component that is dependent on chassis type.

In block 540 the chassis ID is provided to a processor on the circuit board. In block 550 the processor may execute instructions based on the chassis ID. In other words, the processor may execute different instructions based on the type of chassis in which the circuit board is installed. Thus, the processor may behave differently based on the chassis in which the circuit board is installed.

In block 560 the chassis ID may be provided to a third component on the circuit board. In block 570, the operation of the third component may be configured based on the chassis ID. In other words, the third component's operation may be configured based on the chassis in which the circuit board is installed.

Figure 6:
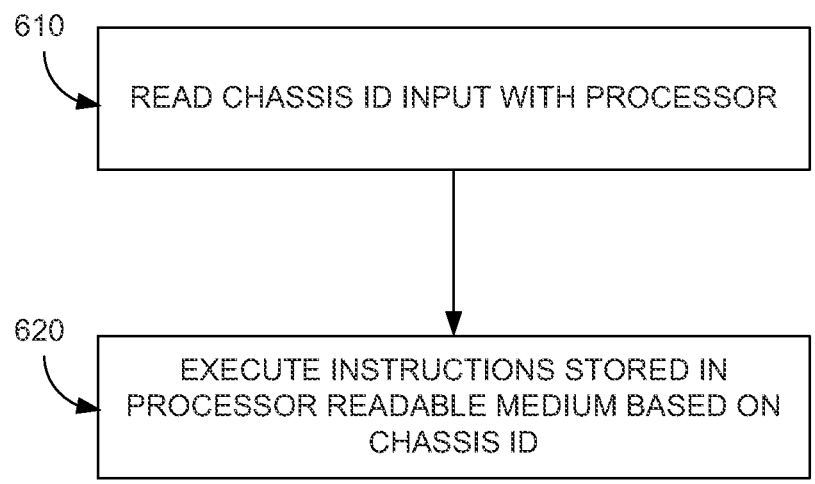
FIG. 6 depicts an example of a high level flow diagram for configuring a processor.

FIG. 6 depicts an example of a high level flow diagram for configuring a processor. In block 610, the chassis ID input may be read with the processor. The chassis ID input may be read through a circuit similar to the one described with respect to FIG. 3. Based on the chassis ID input, the processor is able to identify the type of chassis in which the motherboard housing the processor is installed.

In block 620 the processor may execute instructions stored in a non transitory processor readable medium. The execution of those instructions may be based on the chassis ID. For example, the CPU may execute a first set of instructions for a first chassis type and execute a different set of instructions for a second chassis type. Thus, the CPU may execute instructions that may be specific to the type of chassis in which the motherboard is installed.

We claim:

1. A circuit board comprising:
a plurality of components to operate a plurality of computing device types;
a power switch to enable or disable at least one of the plurality of components; and
an input interface to receive a chassis ID, upon powering the circuit board, the chassis ID identifying a respective one of the plurality of computing device types in which the circuit board is installed;
wherein, based on the chassis ID, the power switch is to automatically enable or disable the at least one component;
wherein the plurality of components comprise a first video output type requiring a first power input, a second video output type operable by the first power input and a second power input, and a multiplexor to receive the chassis ID and select one of the first or the second video output types based on the chassis ID.

2. The circuit board of claim 1, wherein the plurality of components further comprise a memory to store a plurality of instruction sets and a processor to receive the chassis ID, and wherein the chassis ID further causes the processor to execute a respective one of the plurality of instruction sets based on the chassis ID, the respective instruction set being specific to operating the respective computing device type.

3. The circuit board of claim 1, wherein the first video output type is a video graphics array (VGA) requiring wall outlet power, and wherein the second video output type is a digital video interface (DVI) operable by the wall outlet power and power from a power over Ethernet (PoE) connection.

4. The circuit board of claim 1, wherein the chassis ID is received via a signal line coupled to the circuit board, the chassis ID providing a voltage level that engages or disengages the power switch.

5. A computing device comprising:
a chassis for a type of the computing device;
a memory to store a plurality of instruction sets;
a processor to receive a chassis ID for the computing device and execute a respective one of the plurality of instructions sets based on the chassis ID, the chassis ID identifying the type of the computing device, the respective instruction set being specific to operating the respective computing device type; and
a circuit board comprising:
a plurality of components to operate a plurality of computing device types;
a power switch to enable or disable at least one of the plurality of components; and
an input interface to receive the chassis ID, upon powering the circuit board, and transmit the chassis ID to the processor;
a video graphics array (VGA) requiring a first power input; and
a digital video interface (DVI) operable by the first power input and a second power input;
wherein, based on the chassis ID, the power switch is to automatically enable or disable the at least one component.

6. The computing device of claim 5, wherein the VGA outputs to a field programmable gate array (FPGA) and a VGA transmitter, the FPGA and the VGA transmitter operable by the power switch, and wherein the power switch comprises a power transistor to enable the FPGA and the VGA transmitter based on the chassis ID.

7. The computing device of claim 6, wherein the power transistor comprises an N type MOSFET to provide power to the FPGA when the chassis ID indicates that the VGA output is to be enabled.

8. The computing device of claim 5, wherein the first power input comprises wall outlet power, and wherein the second power input comprises power from a power over Ethernet (PoE) connection.

9. The computing device of claim 5 wherein the chassis ID is received via a signal line coupled to the circuit board, the chassis ID providing a voltage level that engages or disengages the power switch.

10. A method for configuring a circuit board, the method performed by a processor of the circuit board and comprising:
receiving a chassis ID at the processor, the chassis ID identifying a respective one of a plurality of computing device types in which the circuit board is installed; and based on the chassis ID, executing a respective set of instructions in a memory of the circuit board, the memory storing a plurality of sets of instructions each being associated with a specified computing device type, the respective set of instructions being specific to operating the respective computing device type in which the circuit board is installed;

wherein the processor includes a video out interface connected to a multiplexor, the multiplexor configured to select between a first video output type and a second video output type;

wherein the respective set of instructions, when executed by the processor, cause the processor to:
based on the chassis ID, configure the video out interface to cause the multiplexor to select one of the first video output type or the second video output type; and wherein the first video output type comprises a video graphics array (VGA) requiring a first power input, and wherein the second video output type comprises a digital video interface (DVI) operable by the first power input and a second power input.

\* \* \* \* \*